United States Patent
Janarthanan et al.

(10) Patent No.: US 9,461,901 B2
(45) Date of Patent: Oct. 4, 2016

(54) SYSTEM AND METHOD FOR DETECTION OF ELEPHANT FLOWS

(71) Applicant: DELL PRODUCTS L.P., Round Rock, TX (US)

(72) Inventors: Kesava Vijaya Krupakaran Janarthanan, TamilNadu (IN); Balaji Venkat Venkataswami, TamilNadu (IN)

(73) Assignee: DELL PRODUCTS L.P., Round Rock, TX (US)

( * ) Notice: Subject to any disclaimer, the term of this patent is extended or adjusted under 35 U.S.C. 154(b) by 33 days.

(21) Appl. No.: 14/510,675

(22) Filed: Oct. 9, 2014

(65) Prior Publication Data

US 2016/0105343 A1    Apr. 14, 2016

(51) Int. Cl.
*H04L 12/28* (2006.01)
*H04L 12/26* (2006.01)
*H04L 12/741* (2013.01)

(52) U.S. Cl.
CPC .......... *H04L 43/0876* (2013.01); *H04L 43/50* (2013.01); *H04L 45/74* (2013.01)

(58) Field of Classification Search
CPC ....... H04L 47/10; H04L 47/30; H04L 47/11; H04L 47/12; H04L 47/35; H04L 47/32; H04L 47/215; H04L 47/20; H04L 12/5602; H04L 47/21
USPC ............ 370/229, 235, 235.1, 236, 250, 360, 370/396, 386, 389
See application file for complete search history.

(56) References Cited

U.S. PATENT DOCUMENTS

| | | | |
|---|---|---|---|
| 9,020,802 B1* | 4/2015 | Florissi | G06F 9/445 703/22 |
| 9,055,076 B1* | 6/2015 | Sorenson, III | H04L 67/1008 |
| 2003/0074467 A1* | 4/2003 | Oblak | H04L 67/1002 709/238 |
| 2004/0093415 A1* | 5/2004 | Thomas | H04L 67/1029 709/227 |
| 2007/0016681 A1* | 1/2007 | Suzuki | G06F 3/0617 709/227 |
| 2011/0051733 A1* | 3/2011 | Hirata | H04L 49/10 370/400 |
| 2014/0237118 A1* | 8/2014 | Matthews | H04L 47/2441 709/226 |

* cited by examiner

*Primary Examiner* — Brenda H Pham
(74) *Attorney, Agent, or Firm* — Haynes & Boone, LLP

(57) ABSTRACT

A system and method for detection of elephant flows includes a switching device. The switching device includes one or more ports, a memory, and a control unit coupled to the ports and the memory. The control unit is configured to detect storage locations information included in one or more first messages. The storage locations information identifies a storage node and is forwarded to a computing device. The control unit is further configured to detect opening of a connection between the computing device and the storage node based one or more second messages received for forwarding on one or more of the ports and determine identifying characteristics of an elephant flow based on information associated with the connection. In some embodiments, the control unit is further configured to forward network packets using an altered forwarding strategy when the network packets are associated with the elephant flow.

19 Claims, 4 Drawing Sheets

SYSTEM AND METHOD FOR DETECTION OF ELEPHANT FLOWS

BACKGROUND

The present disclosure relates generally to information handling systems, and more particularly to detection of elephant flows in networks.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to determine the best routes and/or ways to forward network traffic in a network. As the nodes in the network place changing demands on the network switching products and the network, by requesting the forwarding of different types of network of varying sizes, it may be advantageous for the network switching products to adjust the ways that different packets of network traffic are handled. For example, the network switching products may be tasked with forwarding a large quantity or bandwidth of related data between two nodes for an extended period of time. Data transfers with these characteristics are sometimes referred to as elephant flows. Because of the amount of data in the elephant flow and the amount of time it takes to forward the data, it may be advantageous to adjust the forwarding strategy used by one or more of the network switching devices that are forwarding the network traffic associated with the elephant flow. However, a precursor to adjusting the forwarding strategy to adapt to an elephant flow is the detection of the existence of the elephant flow.

Accordingly, it would be desirable to provide improved systems and methods for detecting elephant flows.

SUMMARY

According to one embodiment, a switching device includes one or more ports, a memory, and a control unit coupled to the ports and the memory. The control unit is configured to detect storage locations information included in one or more first messages received for forwarding on one or more of the ports. The storage locations information identifies a storage node and is forwarded to a computing device. The control unit is further configured to detect opening of a connection between the computing device and the storage node based on one or more second messages received for forwarding on one or more of the ports, and determine identifying characteristics of an elephant flow based on information associated with the connection.

According to another embodiment, a method of managing a switching device includes detecting storage locations information included in one or more first messages received for forwarding at the switching device. The storage locations information identifies a storage node and is forwarded to a computing device. The method further includes detecting opening of a connection between the computing device and the storage node based on one or more second messages received for forwarding at the switching device, determining identifying characteristics of an elephant flow based on information associated with the connection, receiving one or more network packets at the switching device, determining whether the network packets are associated with the elephant flow based on the identifying characteristics, and forwarding the network packets using an altered forwarding strategy when the network packets are associated with the elephant flow. The first and second messages and the network packets are received on ports of the switching device.

According to another embodiment, an information handling system includes a switching device. The switching device includes one or more ports, a memory, and a control unit coupled to the ports and the memory. The control unit is configured to detect storage locations information included in one or more first messages received for forwarding on one or more of the ports. The first messages are exchanged between a Hadoop client on a computing device and a name node of a Hadoop distributed file system (HDFS) or the Hadoop client and a first data node of the HDFS. The storage locations response identify a second data node of the HDFS. The control unit is further configured to detect opening of a connection between the Hadoop client or a storage module of the first data node and a storage module of the second data node based on one or more second messages received for forwarding on one or more of the ports, determine identifying characteristics of an elephant flow based on information associated with the connection, determine whether one or more network packets received for forwarding on one or more of the ports are associated with the elephant flow based on the identifying characteristics, and forward the network packets using an altered forwarding strategy when the network packets are associated with the elephant flow.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
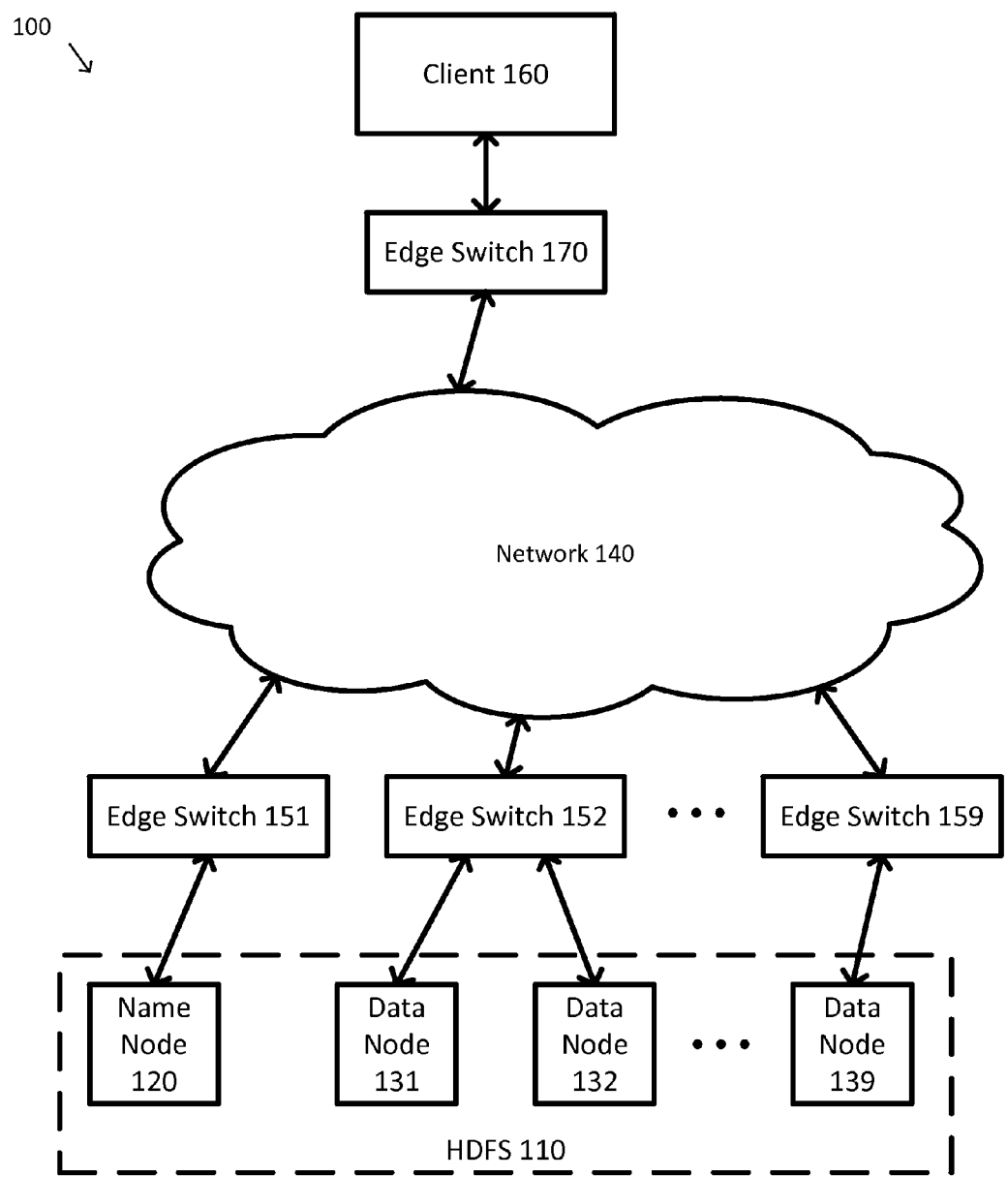
FIG. 1 is a simplified diagram of a distributed computing system according to some embodiments.

FIG. 1 is a simplified diagram of a distributed computing system 100 according to some embodiments. As shown in FIG. 1, distributed computing system 100 includes a Hadoop Distributed File System (HDFS) HDFS 110. In some examples, HDFS 110 may provide a file storage system that stores data in a fashion suitable for large data sets and may also support data mining. In some examples, HDFS 110 may use a distributed storage system wherein multiple copies of each stored block are replicated across storage nodes for redundancy and parallel access with a write-once, read many access pattern.

In some embodiments, HDFS 110 may further support processing of the data stored therein using the map-reduce paradigm. The map-reduce paradigm allows for processing of vast amounts of data in-parallel on large clusters of commodity hardware in a reliable, fault-tolerant manner. HDFS 110 typically stores multiple copies of data in large data blocks. In some examples, the data blocks in HDFS 110 may be 64 Megabytes (MB) in size and the replication factor for each block may be three, meaning that three copies of each HDFS block are stored by HDFS 110. As shown in FIG. 1, HDFS 110 may include at least two types of components, a name-node 120 and one or more data-nodes 131-139.

As shown in FIG. 1, name node 120 and data nodes 131-139 may form an HDFS cluster. In some embodiments, one name node 120 may be centralized and help supervise and/or manage data nodes 131-139. Although a specific configuration of name node 120 and data nodes 131-139 is shown, it is understood that the displayed arrangement of the name node 120 and data nodes 131-139 in FIG. 1 is for exemplification purposes only and that HDFS 110 or and HDFS cluster may include more than one name node and/or any number of data nodes in any other reasonable topology.

In some embodiments, the name node 120 may be responsible for meta-data management of the data stored in HDFS 110, which may include information such as permissions, file sizes, block storage information, and/or the like. In some examples, name node 120 may be a server, a computing device, a cluster, within a virtual machine, and/or the like. Name node 120 may be coupled to a network 140 using an edge switch 151. In some examples, the name node 120 may also be referred to as a master server for HDFS 110.

In some examples, a storage application programming interface (API) may be used to access name node 120 and support storage operations for HDFS 110. In some examples, name node 120 may delegate some or all of storage operations to data nodes 131-139. In some examples, a client 160 may make storage requests by exchanging one or more messages with name node 120. In some examples the one or more messages may be part of a message passing protocol such as API calls, remote procedure call (RPC), web services, and/or the like. In some embodiments, name node 120 may distribute the storage and retrieval of data from HDFS 110 to data nodes 131-139. In some examples, the name node 120 may receive storage requests. In some examples, the storage requests may include requests for portions of the meta-data stored by name node 120.

In some embodiments, edge switches 151-159 and/or 170 may facilitate communication between name node 120 and data nodes 131-139. In some examples, each of the edge switches 151-159 and/or 170 may be a switch, a hub, a bridge, a router, and/or the like. In some examples, each of the edge switches 151-159 and/or 170 may be top of rack switches, blade switches, and/or the like. As shown in the examples of FIG. 1, in some examples, data nodes 131 and 132 are each be coupled to an edge switch 152 and edge switch 159 is coupled to data node 139. In some embodiments, name node 120 and data nodes 131-139 may be coupled to network 140 using any number of edge switches, including some examples where one edge switch couples name node 120 and edge switches 131-139 to network 140. In some examples, when one edge switch is used, the messages between name node 120 and data nodes 131-139, may not be forwarded over the network 140. Although a specific configuration of edge switches 151-159 and 170, name node 120, and data nodes 131-139 is shown, it is understood that the topology of the edge switches 151-159 and 170, name node 120, and data nodes 131-139 as shown in FIG. 1 is for exemplification purposes only and that an HDFS 110 or HDFS cluster may use other topologies.

In some embodiments, data nodes 131-139 may be responsible for storing the HDFS blocks in the native file system using in the respective data node 131-139. In some embodiments, each of the data nodes 131-139 may include one or more processors and memory configured to execute hardware and/or software that implements a Hadoop storage module. In some embodiments, each of the data nodes 131-139 may further include one or more storage devices coupled to the one or more processors. Each of the one or more storage devices may include any kind of storage medium or machine-readable media suitable for storage of HDFS blocks. Each of the storage devices may include one or more physical and/or logical volumes, may support a file system, and/or the like. In some examples, the file system may be a local file system, a distributed file system, and/or the like. Some common forms of machine readable media suitable for the storage devices may include floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read and/or the like. In some examples, each of the data nodes 131-139 may be further coupled to one or more storage devices using a network such as network 140. In some examples, each of the storage devices may be any kind of network accessible storage including a storage area network (SAN), a network-attached storage (NAS), a database server, and/or the like.

In some embodiments, network 140 may be any kind of network including a local area network (LAN), such as an Ethernet, and/or a wide area network (WAN), such as the internet and may vary in complexity from a single switching device operating in relative isolation to large networks of interconnected switching devices. In some examples, each of the switching devices may be switches, hubs, bridges, routers and/or the like and need not all be the same type of device. The interconnected switching devices may be in close proximity to each other or separated by great distances both physically and as distance is measured in computer networking terms. The interconnected switching devices may also work together in a closely cooperative fashion or in a loose weakly coupled fashion. In some examples, the network 140 may also include a variety of hardware and software components that may be configured to process, store, and communicate information based on requests from of a client 160 and various applications. In some embodiments, network 140 may include a network controller, such as a software defined networking (SDN) controller for managing the configuration of the switching devices in network 140 and/or the supervision of one or more forwarding strategies used within network 140.

In some examples, a client, such as client 160 may be a server or computer running software, such as client software (e.g. a Hadoop client), that allows a computer, mobile device, tablet, PDA, Satellite phone, video game console, or other device to connect to a network 140 and/or use the storage services of HDFS 110. Although not shown in FIG. 1, clients other than client 160 may also be coupled to network 140 and HDFS 110 via one or more edge switches. In some examples, client 160 may make storage requests by exchanging one or more messages with name node 120 and/or data nodes 131-139. In some examples the one or more messages may be part of a message passing protocol such as API calls, RPC, web services, and/or the like.

Because of the large size of storage blocks in HDFS (e.g., typically 64 MB), the writing of blocks or the appending of data to existing blocks by clients, such as client 160, in HDFS 110 often results in flows of network traffic between client 160 and one of the data nodes 131-139 that use a significant amount of bandwidth over an extended period of time. These flows of network traffic are sometimes referred to as elephant flows. As the data for a given block is being written by client 160 to one of the data nodes 131-139, it may be forwarded by client 160 to edge switch 170 where it is forwarded through network 140 to the one of the edge switches 152-159 coupling the one of the data nodes 131-139 to network 140. As the data is forwarded by the edge switches 170 and 152-159 and the network switching devices in network 140, this forwarding of data may consume a significant amount of resources in each of these edge switches and network switching devices. Thus, it may be advantageous to detect the elephant flow associated with the writing of this data and make adjustments to the forwarding strategy used by the edge switches 170 and/or 152-159 and/or the network switching devices in network 140 in order to improve the efficiency with which the data in the elephant flow is forwarded and/or to reduce disruptions in other network traffic being forwarded by edge switches 152-159 and/or 170 and/or the network switching devices of network 140.

In some embodiments, edge switches 152-159 and/or 170 and/or the network switching devices of network 140 may make one or more adjustments to create the forwarding strategy for the elephant flow. In some examples, the adjustments may include one or more of the following: increasing the bandwidth allocated to network packets associated with the elephant flow, finding one or more alternate paths for the network packets associated with the elephant flow and/or network packets not associated with the elephant flow, implementing and/or activating one or more quality of service (QoS) mechanisms, and/or the like. In some examples, the QoS mechanisms may include bandwidth reservation, priority queuing, and/or the like. In some examples, the QoS features may be configured using protocols such as the Resource Reservation Protocol (RSVP), Multiprotocol Label Switching (MPLS), Asynchronous Transfer Mode (ATM), and/or the like.

In some examples, the movement of data between client 160 and the one of the data nodes 131-139 may not be the only elephant flow associated with a storage operation initiated by client 160. Because HDFS typically stores blocks in multiple data nodes based on the replication factor, one or more additional copies of the data are transferred to others of the data nodes 131-139 resulting in further elephant flows through the edge switches 152-159 and 170 and network 140. Thus, it would be advantageous to detect these elephant flows as well and adjust the forwarding strategy of at least those portions of the edge switches 152-159 and 170 and the switching devices of network 140 that are forwarding the network packets of those elephant flows.

Consider as an example, the case where client 160 is writing data associated with an HDFS block to data storage devices associated with data node 132. Before the writing of the data begins, client 160 and data node 132 may exchange one or more messages to create a connection between the Hadoop client in client 160 and the HDFS storage module in data node 132. For example, the Hadoop client and the HDFS storage module may create a Transport Control Protocol (TCP) connection between themselves based on the IP addresses of client 160 and data node 132 and the TCP ports associated with the Hadoop client and the HDFS storage module. As the data in the elephant flow is transferred between client 160 and data node 132, each of the network packets may include TCP and Internet Protocol (IP) headers with the two IP addresses and the two TCP ports. In addition, the edge switches 170 and 152, as well as the switching devices in network 140, may be able to detect the packets by inspecting the TCP and IP headers of packets being forwarded and apply the forwarding strategy for the elephant flow when a matching set of IP addresses and TCP ports is detected. A similar pattern of IP addresses and TCP ports may also be associated with the additional elephant flows that develop when the data in the block is being written is being replicated to others of the data nodes 131-139.

Before the edge switches 152-159 and/or 170 and/or the switching devices in network 140 may implement the forwarding strategy for the elephant flow, the identifying characteristics of the elephant flow should be known to the edge switches 152-159 and/or 170 and/or the switching devices of network 140. In the examples above, this may include knowing the IP addresses and TCP ports associated with the elephant flow. There are several approaches to identifying elephant flows and determining the corresponding identifying elements.

A first approach may include enhancing the Hadoop client used by client 160 and/or the HDFS storage modules in name node 120 and/or data nodes 131-139 to notify the edge switches 151-159 and 170 and/or the switching devices of network 140 before a Hadoop write operation is about to begin. This notification, however, is not very practical as it violates the abstraction principles of layering in a network as it would require the Hadoop client and the HDFS storage modules to become aware of the intervening network coupling them.

Another approach may be to include packet snooping by the edge switches 151-159 and 170 and/or the switching devices of network 140 to recognize a recurring pattern of network packets between the same two IP addresses and TCP ports. For example, one or more heuristic rules may be used to detect one or more combinations of quantity, interval, periodicity, and/or the like among the network packets with the same IP addresses and TCP ports in the TCP and IP headers. The difficulty with using heuristic rules, however, is that they may be slow to detect an elephant flow because they may not be applied until after the elephant flow is in operation, thus making the adjustments to the forwarding strategy applicable to a portion of the elephant flow. In addition, the heuristic rules may result in failure to detect one or more elephant flows and/or detecting as an elephant flow a flow that is not an elephant flow resulting in ineffective and/or inappropriate adjustments to the forwarding strategy used by the edge switches 151-159 and 170 and/or the switching devices of network 140.

Accordingly, it would be advantageous to implement an elephant flow detection approach that may detect an elephant flow before network packets from the elephant flow are sent to the edge switches 151-159 and 170 and/or the switching devices of network 140 while also avoiding and/or reducing the false positives and/or false negatives of heuristic methods. One such approach may be determined for HDFS write operations by more closely examining the various exchanges and message passing that occur during HDFS write operations.

Figure 2:
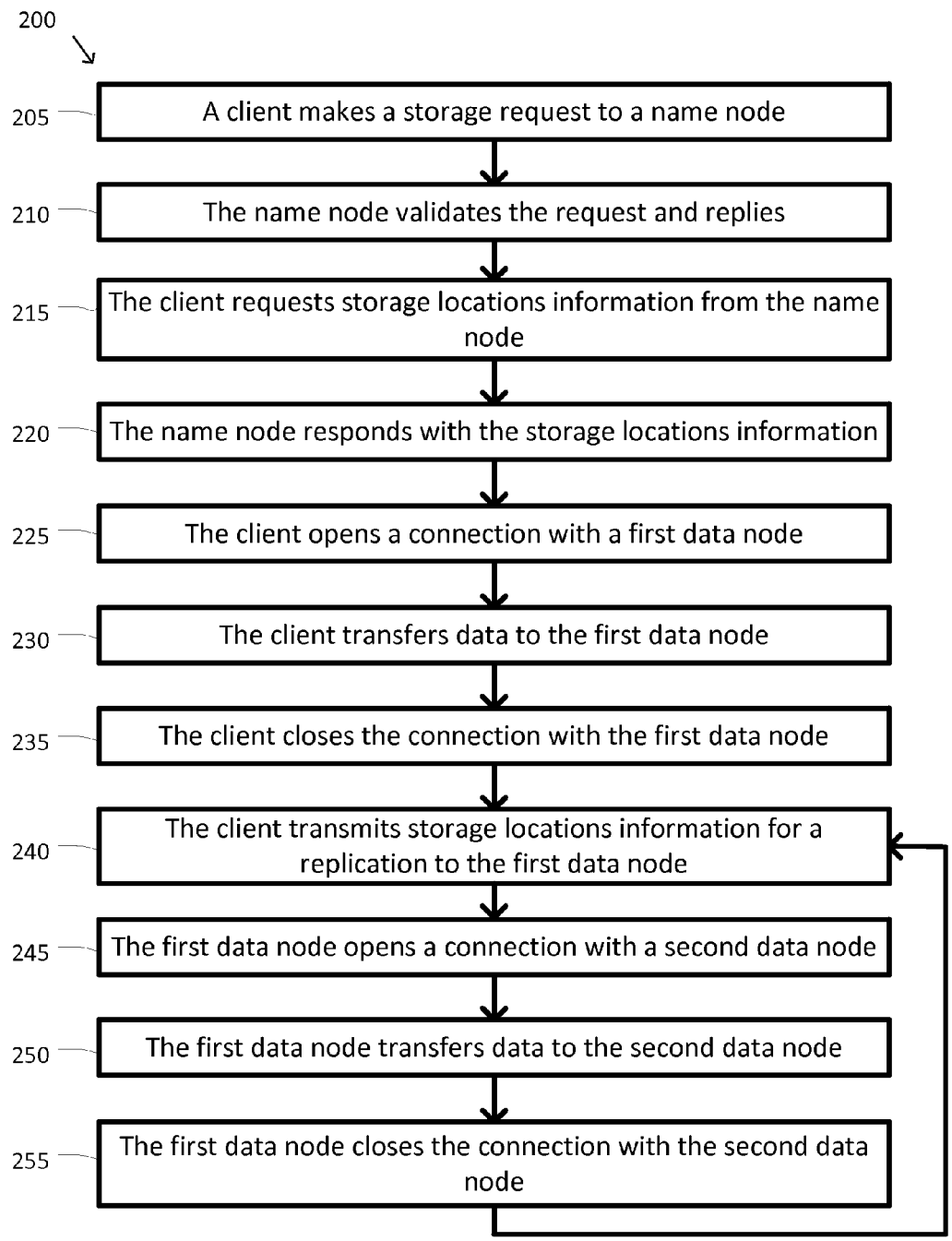
FIG. 2 is a simplified diagram of a method of performing a HDFS write operation according to some embodiments.

FIG. 2 is a simplified diagram of a method of performing a HDFS write operation 200 according to some embodiments. In some embodiments, one or more of the processes 205-255 of method 200 may be implemented, at least in part, in the form of executable code stored on non-transient, tangible, machine readable media that when run by one or more processors (e.g., one or more processors in client 160, name node 120, data nodes 131-139, and/or edge switches 151-159 and/or 170) may cause the one or more processors to perform one or more of the processes 205-255.

At a process 205, a client makes a storage request to a name node. In some embodiments, a client, such as client 160, may make or initiate a storage request with a file system, such as HDFS 110, through a storage controller for the file system. In the examples of FIG. 1, name node 120 may be the storage controller for HDFS 110. In some examples, the storage request may be a request to create and write data to a new block and/or to append data to a previously created block. In the examples of FIG. 1, client 160 may make the storage request to HDFS 100 by exchanging one or more messages to name node 120. In some examples, the one or more messages may be used to activate the Hadoop storage module API supported by name node 120, execute one or more RPCs, initiate a web service, and/or the like. In some examples, the Hadoop client in client 160 may decide to make the storage request after the Hadoop client has collected sufficient data from one or more sources and decides that the accumulated data is to be stored in a HDFS block. The messages may be transmitted over one or more network links and through one or more switching devices in a network. Referring again to the examples of FIG. 1, the messages of process 205 may pass through edge switch 170, network 140, and edge switch 151 as they are forwarded between client 160 and name node 120. In some examples, when client 160 and name node 120 use the same edge switch (e.g., when edge switch 170 and edge switch 151 are the same edge switch), the messages may not be forwarded through network 140.

At a process 210, the name node validates the storage request and replies. When name node 120 receives the storage request made during process 205, name node 120 examines the storage request and validates that it is a storage request name node 120, and HDFS 110, may handle. In some examples, this validation may include one or more operations such as determining whether client 160 has sufficient permission(s) for the storage request, HDFS 110 has sufficient available storage to handle the request, one or more parameters of the storage request are acceptable, and/or the like. Once name node 120 determines the storage request may be handled, name node 120 responds to the storage request by sending one or more messages back to client 160 through edge switch 151, network 140, and edge switch 170. The response from name node 120 may notify client 160 as to whether client 160 may proceed with the storage request.

At a process 215, the client requests storage locations information from the name node. After client 160 receives the response from name node 120 approving the storage request made during process 205, client 160 requests information identifying the storage locations to be used for the data to be written to the HDFS block. Because name node 120 maintains general supervisory and management control over HDFS 110, name node 120 may be responsible for determining which of the data nodes 131-139 is storing the first copy and the replicas of the HDFS block. Consequently, client 160 sends the request for the storage locations information to name node 120. Similar to the storage request of process 205, client 160 may request the storage locations information by exchanging one or more messages with name node 120. In some examples, the one or more messages may be associated with one or more API calls, RPCs, web services, and/or the like. Also, the one or more messages may be forwarded between client 160 and name node 120 through edge switches 170 and 151 as well as network 140.

At a process 220, the name node responds with the storage locations information. In response to the request made by client 160 during process 215, name node 120 may return storage locations information to client 160 via one or more messages forwarded through edge switches 151 and 170 and network 140. In some examples, the storage locations information may include, at least in part, an IP address of the data node selected by name node 120 as that data node from among data nodes 131-139 that is to store a first copy of the data from the storage request made during process 205. In some examples, the storage locations information may also include IP addresses of the one or more data nodes selected by name node 120 as the data nodes 131-139 that are to store the corresponding replicas of the HDFS block. In some examples, the storage locations information may further include one or more logical unit numbers, volume numbers, block identifiers, and/or the like.

At a process 225, the client opens a connection with a first data node. Using the storage locations information provided by name node 120 during process 220, client 160 opens a connection with a first one of the data nodes 131-139 identified as storing the first copy of the HDFS block. In some examples, the IP address of the first data node is used to identify the first data node. In some examples, the connection is a TCP connection identified by the IP addresses of client 160 and the first data node as well as a TCP port of the Hadoop client on client 160 and a TCP port of the storage module on the first data node. In some examples, client 160 may open the connection with the first data node by exchanging one or more messages with the first data node through edge switch 170, network 140, and an edge switch coupling the first data node to network 140 (e.g., edge switch 152 when the first data node is data node 132). In some examples, when the first data node and client 160 are both coupled to network 140 using edge switch 170, the one or more messages may be exchanged through edge switch 170 without having to be forwarded through network 140. In some examples, when the connection is a TCP connection, the one or more messages may include one or more SYN, SYN/ACK, and ACK messages.

At a process 230, the client transfers data to the first data node. Once the connection is opened during process 225, client 160 may use the connection to transfer one or more network packets with data for storage by the first data node. Upon receiving the data, the first data node may store the data as one or more blocks of its local file system that is maintained on one or more storage devices associated with the first data node. When the data being transferred between client 160 and the first data node is a significant portion of an HDFS block, the data transfer is an elephant flow, and client 160 may send the data using a large number of data packets to the first data node over an extended period of time. Because each of the network packets is forwarded from client 160 to the first data node using the connection, both the TCP and IP headers of each of the network packets may include the same IP addresses for client 160 and the first data node as well as the same TCP ports for the Hadoop client in client 160 and the storage module in the first data node. This allows each of the network packets that are part of the data transfer to be identified as part of the same elephant flow. As with the messages exchanged during process 225, the network packets are forwarded from client 160 to the first data node using edge switch 170, the edge switch coupling the first data node to network 140, and network 140; except for the case where client 160 and the first data node use the same edge switch so that the network packets may be forwarded though edge switch 170 without being forwarded through network 140.

At a process 235, the client closes the connection with the first data node. When client 160 finishes transferring the data to be written to the first copy of the HDFS block during process 230, the client 120 may close the connection with the first data node to indicate that the transfer of data is complete. In some examples, the connection may be closed by exchanging one or more messages between client 160 and the first data node through edge switch 170, network 140, and the edge switch coupling the first data node to network 140 (e.g., edge switch 152 when the first data node is data node 132). In some examples, when the connection is a TCP connection the one or more messages may include one or more FIN messages. In some examples, when the connection is closed, this indicates the end of the elephant flow.

At a process 240, the client transmits storage locations information to the first data node. After the connection is closed during process 235 indicating that the client has no more data to write to a first copy of the HDFS block, the process of replicating the HDFS block based on the replication factor for HDFS 110 begins. In some embodiments, client 160 may be responsible for transmitting the storage locations information associated with a replica of the HDFS block to the first data node. In some examples, the storage locations information may include, at least in part, an IP address of the data node selected by name node 120 as that data node from among data nodes 131-139 that is to store the replica of the HDFS block. In some examples, the storage locations information may further include one or more logical unit numbers, volume numbers, block identifiers, and/or the like. In some embodiments, the storage locations response from process 220 may include the same storage locations request of process 240.

At a process 245, the first data node opens a connection with a second data node. Using the storage locations information provided during process 245, the first data node opens a connection with the second data node as identified by the storage locations information. In some examples, the IP address of the second data node is used to identify the second data node. In some examples, the connection may be a TCP connection identified by the IP addresses of the first and second data nodes as well as TCP ports of the storage modules in the first and second data nodes. In some examples, the first data node may open the connection with the second data node by exchanging one or more messages with the second data node through the edge switch coupling the first data node to network 140, network 140, and an edge switch coupling the second data node to network 140 (e.g., edge switch 159 when the second data node is data node 139). In some examples, when the first and second data nodes are both coupled to network 140 using the same edge switch (e.g., edge switch 152), the one or more messages may be exchanged through the same edge switch and may not be forwarded through network 140. In some examples, when the connection is a TCP connection, the one or more messages may include one or more SYN, SYN/ACK, and ACK messages.

At a process 250, the first data node transfers data to the second data node. Once the connection is opened during process 245, the first data node may use the connection to transfer one or more network packets with data for storage by the second data node in the replica of the HDFS block. Upon receiving the data, the second data node may store the data as one or more blocks of its local file system that is maintained on one or more storage devices associated with the second data node. When the data being transferred between the first data node and the second data node is a significant portion of an HDFS block, the data transfer is an elephant flow, and the first data node may send the data using a large number of data packets to the second data node over an extended period of time. Because each of the network packets is forwarded from the first data node to the second data node using the connection, both the TCP and IP headers of each of the network packets may include the same IP addresses for the first and second data nodes as well as the same TCP ports for the storage modules in the first and second data nodes. These common header elements allow each of the network packets that are part of the data transfer to be identified as part of the same elephant flow. As with the messages exchanged during process 245, the network packets are forwarded from the first data node to the second data node using the edge switch coupling the first data node to network 140, the edge switch coupling the second data node to network 140, and network 140 except for the case where the edge switch coupling the first and second data nodes to network 140 is a same edge switch (e.g., edge switch 152) so that the network packets may be forwarded though the same edge switch and may not be forwarded through network 140.

At a process 255, the first data node closes the connection with the second data node. When the first data node finishes transferring the data to be written to the replica of the HDFS block during process 250, the first data node may close the connection with the second data node to indicate that the transfer of data for the replica is complete. In some examples, the connection may be closed by exchanging one or more messages between the first data node and the second data node through the edge switch coupling the first data node to network 140, network 140, and the edge switch coupling the second data node to network 140. In some examples, when the connection is a TCP connection the one or more messages may include one or more FIN messages. In some examples, when the connection is closed, this indicates the end of the elephant flow associated with the replica.

In some embodiments, processes 240-255 may be repeated to copy the data for each of any additional replicas of the HDFS block as determined by the replication factor for HDFS 110. In some examples, when the replication factor for HDFS 110 is three, processes 240-255 would be repeated a second time to copy the data to a second replica (i.e., to make a third copy of the HDFS block). In some examples, processes 240-255 may be repeated by the second data node as it sends data for a replica of the HDFS block on a third data node that is different from both the first and second data nodes.

Careful observation of the processes of method 200 reveals that the edge switches in distributed computing system 100 are able to detect each of the elephant flows created by method 200 before data is transferred using the respective elephant flow during processes 230 and 250 as well as to detect the ending of the elephant flows during processes 235 and 255. For example, each of the elephant flows may be detected by observing transfer of storage locations information followed by the opening of a connection to transfer the data to the data node identified by the storage locations information. Consider the case of the first elephant flow between client 160 and the first data node used to store the first copy of the data in an HDFS block. Each of the messages exchanged by client 160 and name node 120 during process 220 used by client 160 to determine the storage locations information are forwarded through edge switch 170, whether or not client 160 and name node 120 are coupled to network 140 using the same edge switch. Additionally, each of the messages exchanged by client 160 and the first data node to open the connection during process 225 are forwarded through edge switch 170 as well as each of the network packets sent in the first elephant flow. Further, each of the messages exchanged by client 160 and the first data node to close the connection during process 235 are forwarded through edge switch 170. Thus, edge switch 170 is able to detect and observe each of the network messages and packets associated with formation, use, and ending of the first elephant flow. Similarly, the edge switch coupling the first data node to network 140 forwards each of the messages and data packets exchanged during processes 240-255 associated with the second elephant flow used to make the replica of the HDFS block.

Figure 3:
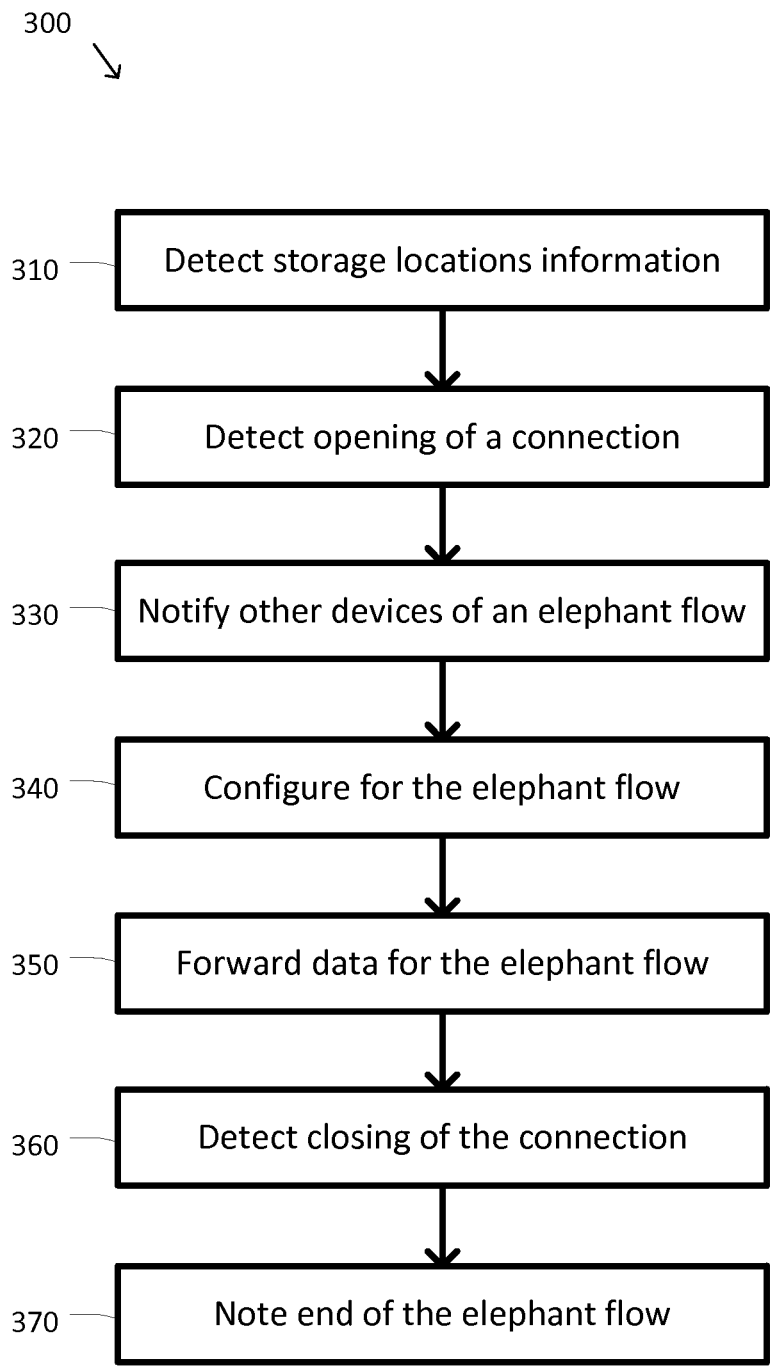
FIG. 3 is a simplified diagram of a method of elephant flow handling according to some embodiments.

FIG. 3 is a simplified diagram of a method 300 of elephant flow handling according to some embodiments. In some embodiments, one or more of the processes 310-370 of method 300 may be implemented, at least in part, in the form of executable code stored on non-transient, tangible, machine readable media that when run by one or more processors (e.g., one or more processors in edge switches 151-159 and/or 170) may cause the one or more processors to perform one or more of the processes 310-370. In some embodiments, process 330 is optional and may be omitted.

At a process 310, storage locations information is detected. In some examples, the storage locations information may correspond to the storage locations information transmitted during processes 220 and/or 240. The storage locations information may be forwarded by the edge switch coupling the client and/or a data node to the network. In some embodiments, the edge switch may determine that the messages the edge switch is forwarding are associated with the storage locations information using a deep packet inspection approach. In some examples, the edge switch may perform deep packet inspection by looking at the headers and/or bodies of the messages, packets, and/or datagrams included in the messages being forwarded to look for specific types of header field types and/or values as well as payload patterns indicative of the transfer of storage locations information. In some examples, the deep packet inspection may include examining the headers and bodies of layer 4 (e.g., TCP) and layer 5 (e.g., application) packets and/or datagrams. In some examples, when the storage locations request is made through a RPC, the deep packet inspection may detect the headers for a RPC as well as the request for the specific remote procedure associated with the transfer of the storage locations information. In some examples, when the storage locations information is associated with a web service call, the deep packet inspection may detect the headers for a web service call as well as the request for the specific web service. In some examples, when the storage locations request is associated with a specific protocol, the deep packet inspection may detect the headers for the specific protocol as well as the request name and/or parameters associated with the storage locations information. In some examples, the deep packet inspection may include parsing eXtensible Markup Language (XML) included in the messages being exchanged, such as used by the Simple Object Access Protocol (SOAP). In addition, as part of the deep packet inspection, the edge switch may parse one or more fields of forwarded messages to determine an identity of the data node designated by the name node in the storage locations information. In some examples, the identity of the data node may be indicated by an IP address for the data node.

At a process 320, opening of a connection is detected. Once the edge switch has detected the storage locations information during process 310, the edge switch may begin looking for the opening of a corresponding connection to the data node identified in the storage locations information. In some examples, the opening of the connection may correspond to the opening of the connection of processes 225 and/or 245. In some embodiments, deep packet inspection may be used by the edge switch to detect the headers and bodies associated with the opening of the connection. In some examples, when the connection is a TCP connection, the deep packet inspection may detect the pattern of TCP messages between the IP address associated with the client and/or a data node and the data node identified by the storage locations information. In some examples, the TCP messages may include one or more SYN, SYN/ACK, and/or ACK messages. In some examples, the deep packet inspection may also determine the TCP ports associated with the connection. Once the IP addresses and the TCP ports are known, these may be used to identify later network packets associated with the connection and which are part of a corresponding elephant flow. In some examples, the edge switch may also record the identifying characteristics of the elephant flow in one or more data structures, databases, flow tables, and/or the like.

At an optional process 330, other devices are notified of the elephant flow. Because the edge switch detecting the elephant flow through processes 310 and 320 may only generally adjust its own forwarding strategy, it may be useful for the edge switch to communicate its detection of the elephant flow with other devices in the network. In some examples, the other devices may include one or more other edge switches, such as the edge switch coupling the data node identified by the storage locations response. In some examples, the other devices may be neighboring devices to the edge switch. In some examples, when the network includes a network controller, such as a SDN controller, the edge switch may notify the network controller. In some examples, the edge switch may notify the other devices using routing, forwarding, and/or QoS protocols such as RSVP, MPLS, and/or the like. In some embodiments, process 340 may not be used when the same edge switch couples the client and the data node identified by the storage locations response to the network because the edge switch is able to forward each of the network packets in the elephant flow without using other switching devices in the network.

At a process 340, the edge switch is configured for the elephant flow. Once the edge switch has detected the elephant flow using processes 310 and 320, the edge switch may adjust its forwarding strategy to more effectively handle and/or forward the network packets in the elephant flow and/or to reduce disruptions to network packets associated with other flows. In some examples, the adjustments may include one or more of the following: increasing the bandwidth allocated to network packets associated with the elephant flow, finding one or more alternate paths for the network packets associated with the elephant flow and/or network packets not associated with the elephant flow, implementing and/or activating one or more QoS features, and/or the like. In some examples, the QoS features may include bandwidth reservation, priority queuing, and/or the like. In some embodiments, the configuration to be used by the edge switch may be received from the network controller and/or through the routing, forwarding, and/or QoS protocols such as RSVP, MPLS, and/or the like.

At a process 350, data for the elephant flow is forwarded. As the client and/or a data node and the data node identified by the storage locations response begin exchanging data using the connection detected during process 320, the edge switch may forward the corresponding network packets using the forwarding strategy configured during process 340. In some examples, the edge switch may detect the network packets that are part of the elephant flow by parsing the network packets using deep packet inspection to detect the pattern of headers and/or the like that identify network packets from the elephant flow. In some examples, when the connection is a TCP connection, the deep packet inspection may identify packets with IP and TCP headers including the IP addresses and TCP ports associated with the elephant flow.

At a process 360, closing of the connection is detected. Once the data is transferred using the elephant flow, the client may close the connection detected during process 330. In some examples, the closing of the connection may correspond to the closing of the connection of processes 235 and/or 255. In some examples, the edge switch may detect the closing of the connection by again parsing the network packets it is forwarding by using deep packet inspection. In some examples, when the connection is a TCP connection, the deep packet inspection may identify the closing of the connection by observing one or more FIN messages with IP and TCP headers corresponding to the IP addresses and TCP ports associated with the elephant flow.

At a process 37, the end of the elephant flow is noted. Once the edge switch detects the closing of the connection during process 360, the edge switch may conclude that the elephant flow is ended and any altered forwarding policy configured during process 350 may be rolled back and/or removed. In some embodiments, the other devices may also be notified of the end of the elephant flow using a process similar to process 330 so that the other devices may be able to adjust their forwarding strategies as well.

In some embodiments, processes 310-370 may be repeated to detect and manage additional elephant flows being forwarded through the edge switch. In some examples, processes 310-370 may also be performed in parallel and/or multi-threaded fashion when multiple elephant flows are being concurrently detected and/or managed by the edge switch.

Figure 4:
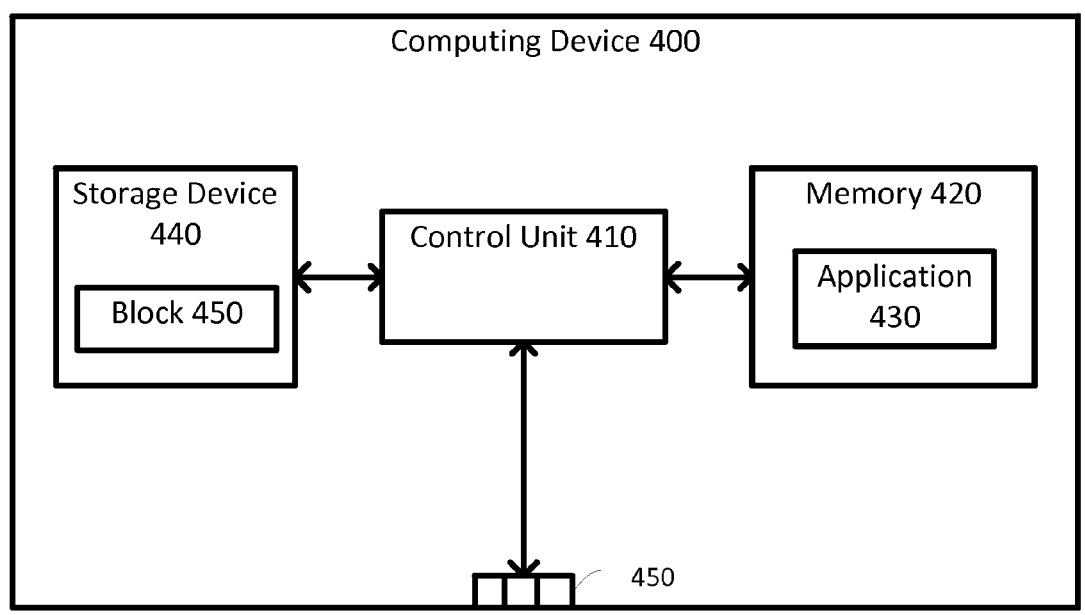
FIG. 4 is a simplified diagram of a computing device according to some embodiments.

FIG. 4 is a simplified diagram of a computing device 400 according to some embodiments. In some embodiments, computing device 400 may be consistent with the servers, computing devices, and/or switching devices associated with name node 120, data nodes 131-139, edge switches 151-159, client 160, and/or edge switch 170. As shown in FIG. 4, computing device 400 includes a control unit 410 coupled to memory 420. Control unit 410 may control the operation of computing device 400. In some examples, control unit 410 may include one or more processors, central processing units, virtual machines, microprocessors, microcontroller, application specific integrated circuits (ASICs), field programmable gate arrays (FPGAs), and/or the like.

Memory 420 may be used to store one or more modules or applications 430 and their corresponding data structures. In some embodiments, the one or more applications 430 may be implemented using software and/or a combination of hardware and software. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. In some examples, the one or more applications may include a Hadoop client when computing device 400 is used as part of client 160, a storage module when computing device 400 is used as part of name node 120 and/or data nodes 131-139, routing and/or forwarding modules when computing device 400 is used as part of edge switches 151-159 and/or 170, elephant flow detection and/or management modules when computing device 400 is used as part of edge switches 151-159 and/or 170, and/or the like. In some examples, the applications 430 may be used to perform and/or facilitate the performance of the processes of methods 200 and/or 300.

In some embodiments, computing device 400 may further include one or more storage devices 440 for storing one or more blocks of data 450. In some examples, each of the storage devices may include one or more physical and/or logical volumes, may support a file system, and/or the like. In some examples, the file system may be a local file system, a distributed file system, and/or the like. Some common forms of storage devices may include, for example, floppy disk, flexible disk, hard disk, magnetic tape, any other magnetic medium, CD-ROM, any other optical medium, RAM, EPROM, FLASH-EPROM, or other memory chips or cartridges, and/or any other medium from which a processor or computer is adapted to read. In some examples, each of the storage devices may be internally coupled to computing device 400 as shown in FIG. 4 and/or may be externally coupled to computing device 400 using cables, drivers, networks, and/or the like.

Computing device 400 further includes one or more ports 450 for coupling computing device 400 to a network, such as network 140, and/or other switching devices. Computing device 400 may receive one or more messages from the network on ports 450 and may transmit one or more messages over the network using ports 450. Depending upon the role of computing device 400 in a computing system, computing device 400 may have as few as one port and as many as dozens or more ports. In some examples, when the computing device 400 is part of name node 120, data nodes 131-139, and/or client 160, the one or more ports may couple computing device 400 to corresponding edge switches 151-159 and/or 170. In some examples, when the computing device 400 is part of edge switches 151-159 and/or 170, the one or more ports may couple computing device 400 to name node 120, data nodes 131-139, client 160, and/or other network switching devices in network 140.

Some embodiments of name node 120, data nodes 131-139, edge switches 151-159, client 160, and/or edge switch 170 may include non-transient, tangible, machine readable media that include executable code that when run by one or more processors may cause the one or more processors to perform the processes of methods 200 and/or 300 as described above. Some common forms of machine readable media that may include the processes of methods 200 and/or 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A switching device comprising:
one or more ports;
a memory; and
a control unit coupled to the ports and the memory, the control unit being configured to:
  detect an elephant flow between a computing device and a storage node;
  receive one or more first network packets at the switching device;
  determine whether the first network packets are associated with the elephant flow; and
  forward the first network packets as elephant flow packets when the first network packets are associated with the elephant flow;
  wherein to detect the elephant flow, the control unit is configured to:
    detect storage locations information included in one or more first messages received for forwarding to the computing device on one or more of the ports, the storage locations information including an address of the storage node and one or more storage locations within the storage node;
    detect subsequent opening of a connection between the computing device and the storage node based on one or more second messages received for forwarding on one or more of the ports; and
    determine as identifying characteristics of the elephant flow, one or more properties that identify the connection;
  wherein to determine whether the first network packets are associated with the elephant flow, the control unit is further configured to determine whether characteristics of the first network packets match the identifying characteristics of the elephant flow.

2. The switching device of claim 1, wherein the control unit is further configured to store the identifying characteristics in the memory.

3. The switching device of claim 1, wherein the control unit is further configured to alter a forwarding strategy used by the switching device to forward the first network packets associated with the elephant flow.

4. The switching device of claim 3, wherein the control unit is further configured to:
receive the first network packets on one or more of the ports; and
forward the first network packets on one or more of the ports using the altered forwarding strategy.

5. The switching device of claim 3, wherein the control unit is further configured to alter the forwarding strategy by performing one or more tasks selected from a group consisting of increasing a bandwidth allocated to the first network packets, finding one or more first alternate paths for the first network packets, finding one or more second alternate paths for second network packets not associated with the elephant flow, implementing one or more quality of service (QoS) mechanisms for the first network packets, and activating one or more QoS mechanisms for the first network packets.

6. The switching device of claim 3, wherein the control unit is further configured to detect a closing of the connection.

7. The switching device of claim 6, wherein the control unit is further configured to undo the altering of the forwarding strategy of the switching device based on the closing of the connection.

8. The switching device of claim 1, wherein the control unit is further configured to notify one or more other switching devices in a network of the determined identifying characteristics of the elephant flow.

9. The switching device of claim 8, wherein the control unit is further configured to notify a network controller of the determined identifying characteristics of the elephant flow.

10. The switching device of claim 1, wherein:
the connection is a transport control protocol (TCP) connection; and
the one or more properties that identify the connection include an internet protocol (IP) address of the computing device, an IP address of the storage node, a TCP port associated with the computing device, and a TCP port associated with the storage node.

11. The switching device of claim 1, wherein the computing device is a client or a first data node and the storage node is a second data node.

12. The switching device of claim 1, wherein one or more of the first messages are forwarded from a name node.

13. The switching device of claim 1, wherein, the switching device is configured to couple the computing device to a network.

14. A method of managing a switching device, the method comprising:
detecting an elephant flow by detecting storage locations information included in one or more first messages received for forwarding by the switching device to a computing device, the storage locations information including an address of a storage node and one or more storage locations within the storage node, detecting subsequent opening of a connection between the computing device and the storage node based on one or more second messages received for forwarding at the switching device, and determining as identifying characteristics of the elephant flow, one or more properties that identify the connection;
receiving one or more network packets at the switching device;
determining whether the network packets are associated with the elephant flow based on the identifying characteristics; and
forwarding the network packets using an altered forwarding strategy when the network packets are associated with the elephant flow;
wherein the first and second messages and the network packets are received on ports of the switching device.

15. The method of claim 14, further comprising sending the identifying characteristics to one or more other switching devices in a network.

16. The method of claim 14, further comprising sending the identifying characteristics to a network controller.

17. The method of claim 14, further comprising:
detecting closing of the connection; and
forwarding the network packets without using the altered forwarding strategy after the connection is closed.

18. An information handling system comprising:
a switching device comprising:
one or more ports;
a memory; and
a control unit coupled to the ports and the memory;
wherein the control unit is configured to:
detect an elephant flow by detecting storage locations information included in one or more first messages received, on one or more of the ports, for forwarding, the first messages being exchanged between a Hadoop client on a computing device and a name node of a Hadoop distributed file system (HDFS) or the Hadoop client and a first data node of the HDFS, and the storage locations information including an address of a second data node of the HDFS and one or more storage locations within the second data node, detecting subsequent opening of a connection between the Hadoop client or a storage module of the first data node and a storage module of the second data node based on one or more second messages received for forwarding on one or more of the ports, and determining as identifying characteristics of the elephant flow, one or more properties that identify the connection;
determine whether one or more network packets received for forwarding on one or more of the ports are associated with the elephant flow based on the identifying characteristics; and
forward the network packets using an altered forwarding strategy when the network packets are associated with the elephant flow.

19. The information handling system of claim 18, wherein:
the connection is a transport control protocol (TCP) connection; and
the one or more properties that identify the connection include an internet protocol (IP) address of the computing device or the first data node, an IP address of the second data node, a TCP port associated with the Hadoop client or the storage module of the first data node, and a TCP port associated with the storage module of the second data node.

* * * * *